UNITED STATES PATENT OFFICE.

HUGO HASSENCAMP, OF ELBERFELD, GERMANY, ASSIGNOR TO THE FARBENFABRIKEN OF ELBERFELD COMPANY, OF NEW YORK.

VIOLET DYE AND PROCESS OF MAKING SAME.

SPECIFICATION forming part of Letters Patent No. 611,628, dated October 4, 1898.

Application filed November 19, 1897. Serial No. 659,185. (Specimens.) Patented in Germany October 14, 1891, No. 68,291; in France October 27, 1891, No. 217,020; in England November 4, 1891, No. 19,062; in Italy December 31, 1891, XXVI, 30,987, LX, 477, and in Austria-Hungary October 9, 1892, No. 23,054 and No. 60,585.

*To all whom it may concern:*

Be it known that I, HUGO HASSENCAMP, doctor of philosophy, residing at Elberfeld, Germany, (assignor to the FARBENFABRIKEN OF ELBERFELD COMPANY, of New York,) have invented a new and useful Improvement in Violet Dyes, (for which the Farbenfabriken, vormals Fr. Bayer & Co., of Elberfeld, Germany, has already obtained Letters Patent in Germany, No. 68,291, dated October 14, 1891; in France, No. 217,020, dated October 27, 1891; in England, No. 19,062, dated November 4, 1891; in Italy, Reg. Gen., Vol. XXVI, No. 30,987, Reg. Att., Vol. LX, No. 477, dated December 31, 1891, and in Austria-Hungary, No. 23,054 and No. 60,585, dated October 9, 1892;) and I hereby declare the following to be a clear and exact description of my invention.

My invention relates to the production of a new bluish-violet triphenylmethane dyestuff by condensing in equimolecular proportions tetramethyldiamidobenzhydrol and methylbenzylanilindisulfo-acid of the following formula:

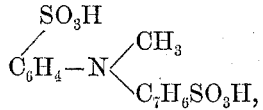

oxidizing the leuco compound thus produced of the formula

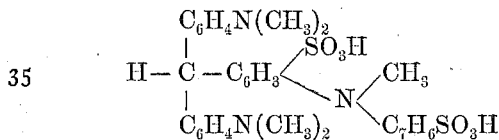

and transforming the resulting oxidation product into an alkaline salt—for instance, into the sodium salt having most probably the formula

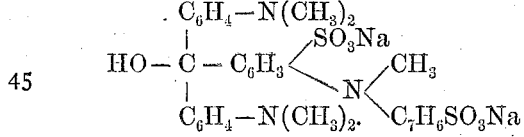

In carrying out my new process practically I can proceed as follows: At first I prepare the methylbenzylanilindisulfo-acid, for instance, in the following manner: One hundred and ninety-seven kilos, by weight, of methylbenzylanilin are gradually introduced with stirring into three hundred kilos, by weight, of a fuming sulfuric acid (containing twenty-two per cent. of $SO_3$) taking care that the temperature of the mixture does not exceed 30° centigrade. Into the resulting solution four hundred kilos, by weight, of a fuming sulfuric acid (containing seventy per cent. of $SO_3$) are slowly stirred at the same temperature. Subsequently the temperature is raised to about 50° centigrade and the reaction mixture is kept stirred at this temperature until the formation of the disulfo-acid is finished, which stage will be reached if a test portion of forty-five grams, by weight, of the reaction mixture when mixed with forty-eight grams of ice and fifty-eight cubic centimeters of a strong soda-lye (containing 31.7 per cent of NaOH) yields on cooling a clear solution. After the formation of the disulfo-acid is finished the liquid is cooled and poured into two thousand kilos, by weight, of ice-water and the resulting mixture is neutralized by means of sodium carbonate, the sodium salt of the disulfo-acid being thus formed.

In order to transform the methylbenzylanilindisulfonate of sodium thus obtained into the new dyestuff I can proceed in the following manner: The solution of the sodium salt obtained as hereinbefore described is stirred into a solution prepared from two hundred and seventy kilos, by weight, of tetramethyldiamidobenzhydrol, two hundred kilos, by weight, of concentrated sulfuric acid, (66° Baumé,) and three thousand liters of water. The resulting mixture is heated at about 80° centigrade under continuous stirring until the condensation of the tetramethyldiamidobenzhydrol with the methylbenzylanilindisulfo-acid is completed. Subsequently the liquid is cooled to 50° by adding ice and the mineral acid contained therein is neutralized by the addition of two hundred and ten kilos, by weight, of sodium carbonate. The resinous mass precipitated by means of this operation, which represents the above defined leucodisulfo-acid, is separated from the liquid and dissolved in two thousand liters of water. This solution is rendered weakly alkaline by means of lime [Ca(OH)$_2$]. Thus a precipitate is obtained from which the liquid is separated by filtration and subsequently washing, the residue remaining on the filter. To the joint filtrates which contain the calcium salt of the said leucodisulfo-acid eighty kilos, by weight, of sodium carbonate (Na$_2$CO$_3$) are added in order to transform the calcium salt of the leucodisulfo-acid into the sodium salt. The solution of the latter, which is obtained by filtering and subsequently washing the calcium carbonate remaining on the filter, is mixed with such a quantity of water that the whole weight of the liquid amounts to three thousand eight hundred and fifty kilos.

Five hundred kilos, by weight, of the solution thus obtained are mixed with one hundred kilos, by weight, of a fifty per cent. acetic acid and subsequently one hundred and fifteen kilos, by weight, of a lead dioxid paste (containing twenty per cent. of PCO$_2$) are added with stirring. Stirring is continued for a quarter of an hour and then twenty kilos, by weight, of sodium sulfate are added in order to separate the lead in the form of lead sulfate. The mixture is then filtered and the filtrate which contains the finished dyestuff is completely evaporated in enameled pans.

The dyestuff thus obtained represents after pulverizing a brownish-red powder, soluble in water with a bluish-violet color which turns into yellowish-green on the addition of dilute hydrochloric or sulfuric acid. By concentrated sulfuric acid it is dissolved with a yellowish-brown color.

The new coloring matter dyes unmordanted wool in acid baths bluish-violet shades which are fast to alkalies.

Having now described my invention and in what manner the same is to be performed, what I claim as new, and desire to secure by Letters Patent, is—

1. The process for producing a new triphenylmethane dyestuff by combining in equimolecular proportions tetramethyldiamidobenzhydrol and methylbenzylanilindisulfo-acid, oxidizing the resulting leuco compound and converting the oxidation product into an alkaline salt, substantially as described.

2. As a new article of manufacture the new dyestuff obtainable from tetramethyldiamidobenzhydrol and methylbenzylanilindisulfo-acid having the following formula:

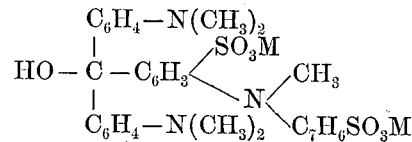

in which formula M represents an atom of an alkaline metal such as sodium, potassium or the like, representing in the form of the sodium salt a brownish-red powder, soluble in water with a bluish-violet color which changes into yellowish green on the addition of dilute hydrochloric or sulfuric acid, being dissolved by concentrated sulfuric acid with a yellowish-brown color, dyeing unmordanted wool in acid-baths bluish-violet shades which are fast against the action of alkalies, substantially as described.

In testimony whereof I have signed my name in the presence of two subscribing witnesses.

HUGO HASSENCAMP.

Witnesses:
R. E. JAHN,
OTTO KÖNIG.